United States Patent [19]
Horwat

[11] Patent Number: 6,021,275
[45] Date of Patent: Feb. 1, 2000

[54] OBJECT CODE STRUCTURE AND METHOD FOR TRANSLATION OF ARCHITECTURE INDEPENDENT PROGRAM IMPLEMENTATIONS

[75] Inventor: Waldemar Horwat, Sunnyvale, Calif.

[73] Assignee: General Magic, Inc., Sunnyvale, Calif.

[21] Appl. No.: 08/692,357

[22] Filed: Aug. 5, 1996

[51] Int. Cl.[7] ................................................ G06F 12/10
[52] U.S. Cl. ........................................ 395/707; 395/705
[58] Field of Search ................................... 395/705, 500, 395/707, 898, 380, 200.76

[56] References Cited

U.S. PATENT DOCUMENTS

| 5,339,434 | 8/1994 | Rusis ................................ 395/300.76 |
| 5,550,987 | 8/1996 | Tanaka .................................... 395/286 |
| 5,574,923 | 11/1996 | Heeb et al. ......................... 395/800.38 |
| 5,604,905 | 2/1997 | Tevanian et al. ....................... 395/706 |
| 5,664,189 | 9/1997 | Wilcox et al. .......................... 707/205 |
| 5,701,423 | 12/1997 | Crozier .................................... 345/335 |
| 5,701,483 | 12/1997 | Pun ......................................... 395/681 |

FOREIGN PATENT DOCUMENTS 729094   8/1996   European Pat. Off. .

OTHER PUBLICATIONS

James R. Gillig, Endian–Neutral Software, Part 2, Dr. Dobb's Journal, vol. 19. No. 13, Nov. 1994, pp. 44, 46–49, and 51.

Endian Test for Determining the Endian Mode of Program Execution, IBM Technical Disclosure Bulletin, vol. 38, No. 8, Aug. 1995, pp. 525–527.

Method of Providing Microcode Compatibility Between Microprocessors, IBM Technical Disclosure Bulletin, vol. 34, No. 4B, Sep. 1991, pp. 242–243.

Victor Schneider, Converting a Portable Pascal P–Code Interpreter to a Code Generator, © 1989, pp. 1111–1113.

(List continued on next page.)

Primary Examiner—James P. Trammell
Assistant Examiner—Matthew Smithers
Attorney, Agent, or Firm—Skjerven, Morrill, MacPherson, Franklin & Friel LLP.

[57] ABSTRACT

Endian format affects the representation of both literal data and pointer data whether represented in a global data specification (i.e., in a data section) or as immediate operand values in-line with Intercode instructions. The present invention provides for endian-independent representation of literal data, pointer data, literal operands and pointer operands. For literal data represented in a data section, an associated data translation script provides an Intercode translator with translation instructions for transforming byte ordering within the data section on a unit-of-storage by unit-of-storage basis (if required for the particular target processor). In this way, literal data of arbitrary structure can be specified independent of endian format. For pointer data represented in the data section, the associated data translation script provides the Intercode translator with relocation expressions for transforming pointer data values to effective memory addresses. Relocation expressions compute a linear combination of relterms, wherein relterms include constants, data section addresses, function gate addresses, and translation time constants. The translation time constants evaluate to a first value if evaluated on a little-endian target processor and to a second value if evaluated on a big-endian target processor. In this way, pointer data values can be specified independent of actual runtime location of the data to which the pointer operand refers and independent of endian format. A sequence of transformation instructions and relocation expressions are provided in the form of a data translation script to allow for endian-independent representation arbitrary data structures which include both literal and pointer data.

13 Claims, 9 Drawing Sheets

OTHER PUBLICATIONS

David W. Wall and Michael L. Powell, The Mahler Experience: Using and Intermediate Language as the Machine Description, Proceedings of the 2nd International Conference on Architectural Support for Programming Languages and Operating Systems, © 1987, pp. 100–104.

"TDF Specification", Issue 2.1 (Jun. 1993), Defense Research Agency.

"The Java™ Virtual Machine Specification", Chapter 4 entitled "The Class File Format", Tim Lindholm and Frank Yellin, © 1997, pp. 83–137.

"The Structure of ANDF: Principles and Examples", Stavros Macrakis, © 1993, pp. 1–15.

|   n   |  n+1  |  n+2  |  n+3  |
|-------|-------|-------|-------|
|  00   |  0F   |  42   |  40   |

FIG. 1A

|   n   |  n+1  |  n+2  |  n+3  |
|-------|-------|-------|-------|
|  40   |  42   |  0F   |  00   |

FIG. 1B

| | | 0 8 |
|---|---|---|
| 410 { | 0...239 | UNSIGNED |

| | | 0 5 | 0 11 |
|---|---|---|---|
| 420 { | -1024...1023 | 11110 | SIGNED |

| | | 0 8 | 0 16 |
|---|---|---|---|
| 430 { | 2768...32767 | 11111000 | SIGNED HALFWORD |

| | | 0 8 | 0 24 |
|---|---|---|---|
| 440 { | $-2^{23}...2^{23}-1$ | 11111001 | SIGNED |

| | | 0 8 | 0 32 |
|---|---|---|---|
| 450 { | $-2^{31}...2^{31}-1$ | 11111010 | SIGNED WORD |

| | | 0 8 | 0 64 |
|---|---|---|---|
| 460 { | $-2^{63}...2^{63}-1$ | 11111011 | DOUBLEWORD ... |

| | | 0 8 |
|---|---|---|
| 470 { | RESERVED | 111111XX |

RELTERM 811: [0-1: 1] [ASIZE] [4-8: BASE] [8+: ARG...]

RELTERM 812: [0-1: 1] [ASIZE] [4-8: BASE] [8+: ARG...]

RELTERM 813: [0-1: 1] [ASIZE] [4-8: BASE] [8+: ARG...]

821: [0-1: C] [000] [BASE]
822: [0-1: C] [001] [BASE] ARG 0...15 (to 4)
823: [0-1: C] [010] [BASE] ARG -128...127 (to 8)
824: [0-1: C] [011] [BASE] ARG -32768...32767 (to 16)
825: [0-1: C] [100] [BASE] ARG $-2^{23}...2^{23}-1$ (to 24)
826: [0-1: C] [101] [BASE] ARG $-2^{31}...2^{31}-1$ (to 32)
827: [0-1: C] [110] [BASE] ARG $-2^{63}...2^{63}-1$ (to 6)
828: [0-1: C] [111] [BASE] RESERVED

921 { 0 | 000 |

922 { -8...7 | 001 | | SIGNED |

923 { -128...127 | 010 | | SIGNED BYTE |

924 { -32768...32767 | 011 | | SIGNED HALFWORD |

925 { $-2^{31}...2^{31}-1$ | 100 | | SIGNED WORD |

926 { $-2^{63}...2^{63}-1$ | 101 | | DOUBLEWORD ... |

927 { RESERVED | 110 |

928 { RELOCATION | 111 | | REL... |

OBJECT CODE STRUCTURE AND METHOD FOR TRANSLATION OF ARCHITECTURE INDEPENDENT PROGRAM IMPLEMENTATIONS

BACKGROUND OF THE INVENTION

1. Field of the Invention

The present invention relates to a portable virtual machine architecture, and more particularly to object code structures for dynamic translation of an architecture-independent program implementation.

2. Description of the Relevant Art

There have been a number of efforts to design systems which are portable across machine architectures, i.e., systems which can operate on a variety of different hardware platforms. However, such efforts have been hampered by incompatibilities in operating system interfaces and fundamental hardware capabilities. Approaches to the portability problem have included interpreters, translators, compilers with a common intermediate format across platforms, and virtual machine architectures. Although the various approaches tend to blur together, some distinctions can be made. Interpreters are programs which accept programs written in source code and which perform the sequence of computations, i.e., of machine level instructions, implied by the source code. The UCSD Pascal system, which was the primary implementation of Pascal for the Apple II, was one of the most successful early attempts at a portable system. The system interpreted byte code which made it architecture-independent (see Apple Computer, Inc. *Apple Pascal Operating System Reference Manual*, 1980, pp. 229–245). Smalltalk-80 also defined a byte-code interpreter (see Adele Goldberg and David Robson, *Smalltalk80: The Language and its Implementation*, Addison-Wesley, 1983). One of Smalltalk-80's main advances was the clean integration of the interpreter into the system, where the system has a flexible interface to examine and control interpretation, permitting one to write portable programming tools. Some variants of the Smalltalk-80 system dynamically compiled the byte-code with some sacrifice in the above functionality.

A translator, as contrasted with an interpreter, accepts as an input a program written in a source format and produces as output an object code representation of the program. Usually, the object code is machine language for a particular processor architecture. Translators can be divided into assembler translators, which translate low level languages such as assembly language, and compilers, which translate high-level languages such as C, C++, Pascal, Ada, etc.

Compiler writers have been striving to achieve a common intermediate format for some time. A common intermediate format would enable them to produce n front ends and m back ends (n+m total components) rather than n*m compilers to compile n languages for m target machine architectures. The GNU C compiler went quite far in this direction, but the intermediate format is ad hoc and is riddled with special cases for architectural features. The Marion system (see David G. Bradlee, Robert R. Henry, and Susan J. Eggers, *The Marion System for Retargetable Instruction Scheduling*, Proceedings of the 1991 ACM SIGPLAN Conference on Programming Language Design and Implementation, 1991, pp. 229–240) was another attempt, but it too had to be modified for each new target architecture.

Hardware designers have attempted to institute a virtual architecture as the assembly language for their systems. The Transputer, which is a modular, scalable multiprocessor architecture is an example of such a system. The virtual architecture allows changes in the underlying physical structure of the machine architecture without program recompilation. Limited virtual architecture mechanisms can be seen in processors such as the Motorola 68040, where some instructions are emulated by traps. A related software approach is to define an intermediate form from which programs are translated into the machine language of the target processor. Mahler was an attempt at this and the authors claim encouraging results (see David W. Wall and Michael L. Powell, *The Mahler Experience: Using an Intermediate Language as the Machine Description*, Proceedings of the 2nd International Conference on Architectural Support for Programming Languages and Operating Systems, 1987, pp. 100–104).

The Open Software Foundation's (OSF's) ANDF (the Architecture-Neutral Distribution Format) and its precursor TDF are other steps in this direction. See Stavros Macrakis, *The Structure of ANDF: Principles and Examples*, Open Software Foundation, 1993 and United Kingdom Defense Research Agency, TDF Specification, Issue 2.1 June 1993. ANDF defines the form of data passed from an ANDF producer (which is language-dependent and machine-independent) to an ANDF installer (which is language- and machine-independent). An ANDF producer is like a compiler front-end (syntax and semantics analyzer), and an ANDF installer is end (code generator and optimizer). ANDF itself is thus a form of compiler intermediate language. Unfortunately, since ANDF (and TDF) leaves most of the compiling work to the installer, it is unsuitable for dynamic translation.

Individual machine architectures often represent data according to differing sets of representation conventions. Representations which are in accordance with the conventions of a particular machine architecture are said to be native to that machine architecture. Two common sources of variation in native representations are alignment and byte-ordering conventions.

Certain processor architectures require that data be aligned in accordance with a set of machine-specific alignment rules. For example, most RISC architectures require that data be aligned on a natural boundary in physical memory (i.e., at an address that is a multiple of the size of the data type). For a two-byte quantity (e.g., a 16-bit, or short, integer) such a natural boundary alignment requirement requires that the first byte of the two-quantity appear at an even byte address. Similarly, the first byte of a four-byte quantity (e.g., a 32-bit, or long, integer) and of an eight-byte quantity (e.g., a double precision floating point number) must appear at an address which is a multiple of 4 and 8, respectively. Other architectures, notably the 80×86 architecture, have no such alignment restrictions.

Another source of architecture-specific variation is byte-ordering. In some processor architectures, bytes are ordered according to a scheme where the least significant byte is stored in the lowest byte address. This scheme is known as little-endian byte ordering. In many other architectures, bytes are ordered according to a big-endian scheme where the least significant byte is stored in the highest byte address. FIG. 1A illustrates the representation of the number 1,000,000 (i.e., 0F4240 in hexadecimal) as a 32-bit integer in accordance with the big-endian scheme. FIG. 1B illustrates the corresponding little-endian representation. Most microprocessor architectures including the Motorola 680×0 and 88×00 series, the PowerPC, the MIPS R×000 series microprocessors adhere to the big-endian scheme. However, several architectures, notably the Intel 80×86 series and the DEC VAX architectures, are little-endian.

SUMMARY OF THE INVENTION

It has been discovered that a high degree of architectural independence can be achieved by providing a compiler which generates a machine independent object code format (i.e., Intercode object code) which is translated at run-time into native code for a particular target machine architecture. Such run-time translation involves the conversion of Intercode instruction sequences to native code sequences and the conversion of static data formats to native data formats. In particular, the present invention includes data translation scripts compiled into the Intercode object code which provide for run-time relocation of pointers and for run-time byte order conversion of data from bigendian format to little-endian format (or vice versa). The specific relocations and byte order conversions performed at run-time are responsive to native data formats of the target machine architecture. In this way, a common distribution format is provided for programs which can efficiently run on both big- and little-endian machine architectures.

Endian format affects the representation of both literal data and pointer data whether represented in a global data specification (i.e., in a data section) or as immediate operand values in-line with Intercode instructions. The present invention provides for endian-independent representation of literal data, pointer data, literal operands and pointer operands.

For literal data represented in a data section, an associated data translation script provides an Intercode translator with translation instructions for transforming byte ordering within the data section on a unit-of-storage by unit-of-storage basis (if required for the particular target processor). In this way, literal data of arbitrary structure can be specified independent of endian format. For pointer data represented in the data section, the associated data translation script provides the Intercode translator with relocation expressions for transforming pointer data values to effective memory addresses. Relocation expressions compute a linear combination of relterms, where such relterms include constants, data section addresses, function gate addresses, and translation time constants. The translation time constants evaluate to a first value if evaluated on a little-endian target processor and to a second value if evaluated on a big-endian target processor. In this way, pointer data values can be specified independent of actual runtime location of the data to which the pointer operand refers and independent of endian format. A sequence of transformation instructions and relocation expressions are provided in the form of a data translation script to allow for endian-independent representation of arbitrary data structures which include both literal and pointer data.

For literal operands represented as immediate values in-line with Intercode instructions, the storage size of a literal operand representation correlates with the associated Intercode instruction opcode and, for certain integer operands, with the particular operand encoding. Since literal operand values for Intercode instructions are encoded in a known endian format (namely, big-endian) and since the storage size of an individual immediate operand is encoded either by the associated Intercode instruction or by the operand encoding itself, an Intercode translator can perform the appropriate byte ordering transformation (if the target processor requires little endian format). For pointer operands represented as immediate values in-line with Intercode instructions, individual pointer operands are represented as relocation expressions. As before, relocation expressions compute a linear combination of relterms, wherein the translation time constants included therein evaluate to a first value if evaluated on a little-endian target processor and to a second value if evaluated on a big-endian target processor. In this way, pointer operand values can be specified independent of actual runtime location of the data to which the pointer operand refers and independent of endian format.

In one embodiment, an object code structure encoded in computer readable media includes a code section, a data section associated with the code section, and a data translation script. The data section includes a first representation of data organized as units of storage and the data translation script is associated with the first representation. The data translation script includes an instruction sequence for reversing byte ordering within the units of storage of the first representation when the first representation is not in accordance with byte ordering of the target architecture.

In a further embodiment, the first representation includes a first unit of storage representing literal data and the data translation script includes a translation instruction corresponding to the first unit of storage and descriptive of an endian tranformation of the literal data.

In yet a further embodiment, the first representation further includes a second unit of storage representing pointer data and the data translation script further includes a relocation expression corresponding to the second unit of storage and descriptive of a transformation of the pointer data to an effective memory address.

In still yet a further embodiment, the relocation expression encodes a linear combination of terms including one or more terms selected from a set including a constant term, a data section address term, a function gate address term, and a translation time constant term. The translation time constant term, if any, evaluates to either a first value or a second value depending on whether the relocation expression is evaluated on a big-endian or a little-endian target architecture.

In another embodiment, an object code structure encoded in computer readable media includes a code section; a data section associated with the code section and first and second first data translation scripts. The data section includes first and second representations of data, each organized as units of storage. The first representation includes first and second units of storage and the second representation includes third and fourth units of storage. The first and third units of storage represent corresponding big-endian and little-endian representations of literal data and the second and fourth units of storage represent corresponding representations of pointer data. The first data translation script is associated with the first representation and includes a first relocation expression which corresponds to the second unit of storage and which is descriptive of a transformation of pointer data represented therein to an effective memory address. The second data translation script is associated with the second representation and includes a second relocation expression which corresponds to the fourth unit of storage and which is descriptive of a transformation of pointer data represented therein to an effective memory address.

In still yet another embodiment, a method for translating an architecture-independent program implementation into native code for a target architecture includes a data section reading step, a data translation script reading step, and a byte order reversing step. The data section is read from computer readable media and includes a representation of data organized as units of storage. The data translation script is also read from computer readable media. The data translation script is associated with the representation and has a sequence of instructions corresponding to the units of storage. During the byte order reversing step, byte ordering of literal data represented in a first one of the units of storage is reversed in accordance with the corresponding instruction from the data translation script when the literal data is not in accordance with byte ordering of the target architecture.

In a further embodiment, the data translation script reading step includes reading a translation instruction which corresponds to a first one of the units of storage and which is descriptive of an endian transformation of literal data represented therein. In another further embodiment, the data translation script reading step includes reading a relocation expression which corresponds to a second one of the units of storage and which is descriptive of a transformation of pointer data to an effective memory address represented therein.

In a further embodiment the method further includes relocating pointer data encoded within the second one of the units of storage in accordance with the corresponding relocation expression from the data translation script.

In yet a further embodiment, the pointer relocating step includes selectively supplying a byte offset term as part of the relocation expression. When the representation is in little-endian format, a non-zero byte offset term is supplied as part of the relocation expression if the target architecture is big-endian and a zero byte offset term is supplied as part of the relocation expression if the target architecture is little-endian. When the representation is in big-endian format, a non-zero byte offset term is supplied as part of the relocation expression if the target architecture is little-endian and a zero byte offset term is supplied as part of the relocation expression if the target architecture is big-endian.

In still yet another embodiment, a system for supplying an architecture-independent program implementation includes an object code structure encoded in computer readable media and a translator executable on a target architecture. The object code structure includes a code section, a data section associated with the code section and which includes a first representation of data organized as units of storage, and a data translation script associated with the first representation. The data translation script includes an instruction sequence for reversing byte ordering within the units of storage when the first representation is not in accordance with byte ordering of a target architecture. The translator is executable on the target architecture for reading the first representation and the data translation script. The translator reverses byte ordering of the literal data represented in first ones of the units of storage in accordance with corresponding instructions from the data translation script when literal data so represented is not in accordance with byte ordering of the target architecture.

BRIEF DESCRIPTION OF THE DRAWINGS

The present invention may be better understood, and its numerous objects, features, and advantages made apparent to those skilled in the art by referencing the accompanying drawings.

FIG. 1A is a pictorial illustration of the big-endian byte ordering of a 32-bit word.

FIG. 1B is a pictorial illustration of the little-endian byte ordering of a 32-bit word.

FIG. 4 is a pictorial illustration of variable length bnum encodings of integer data in accordance with the teachings of the present invention.

FIG. 8A is pictorial illustration of the structure of a relocation expression, including multiple relterms, constructed in accordance with the teachings of the present invention.

FIG. 8B is a pictorial illustration of multiple encoding formats for relterms of a relocation expression constructed in accordance with the teachings of the present invention.

DETAILED DESCRIPTION OF THE INVENTION

The following sets forth a detailed description of the best contemplated mode for carrying out the invention. The description is indented to be illustrative of the invention and should not be taken to be limiting.

The Intercode™ object code format is an architecture-independent object code format, with an emphasis on space efficiency, designed for use in lightweight portable computers. Though the Intercode object code format is well suited to the power and memory limitations of portable, handheld computers and personal digital assistants (PDAs), architecture-independent character of Intercode object code make it suitable for a wide variety of architecture-independent distribution media applications. A program compiled into Intercode object code can be executed on an extensible set of modem 32-bit microprocessors. Advantageously, such Intercode programs can be placed in ROM and then dynamically translated by an Intercode translator into native code. Almost all C and C++ programs can be compiled into Intercode object code without changes, although the Intercode object code format is not C-specific—other procedural languages can also be supported.

An Intercode translator can be run in one of two modes: batch or caching. Batch mode provides the best performance—typically only 2% slower than optimized native MIPS gcc (Gnu C compiler) output for a 14000-line C++ program—but requires that the entire translated program fit in memory. Caching mode has fixed RAM requirements—typically about 50K for a code cache—but incurs at least a 30% speed penalty for compute-bound code. In terms of space, Intercode object code is about 25% smaller than fully optimized, nonrelocatable native MIPS code.

Containers for functions represented in Intercode object code, i.e., Intercode functions, are called Multicode™ segments. A Multicode segment contains code and static data, both of which can be represented in a variety of different formats. Code can be in any mix of Intercode object code and native object code formats on a function-by-function level of granularity. Thus, performance-critical sections of a program can be optimized for particular target architectures and provided as native code, while Intercode object code is also provided, thereby preserving the ability to run the program on any architecture that provides an Intercode translator. A Multicode segment can also serve a container for compressed native code in situations where architecture neutrality is not important.

Figure 2:
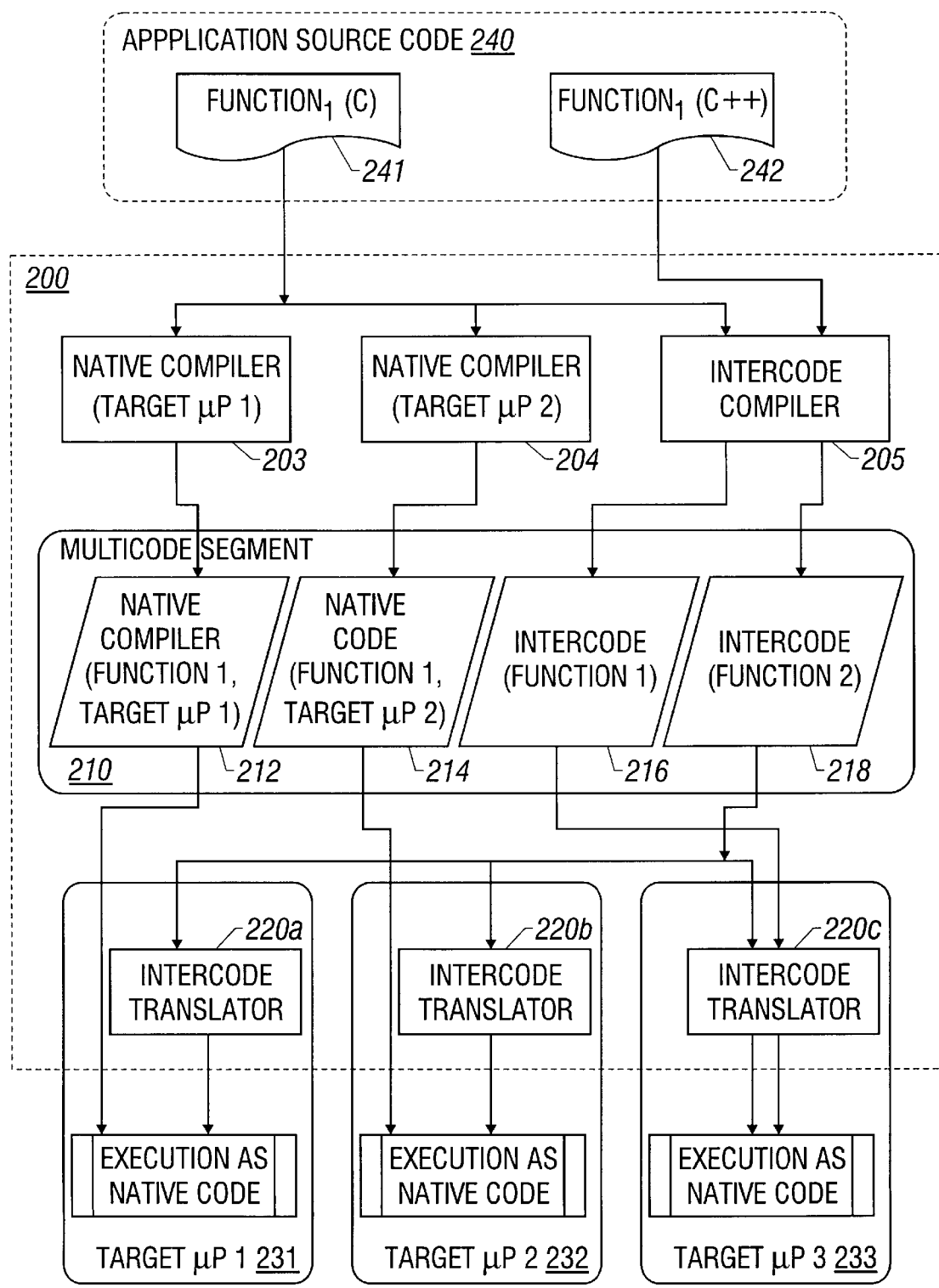
FIG. 2 is a functional block diagram of a system for providing a portable machine architecture in accordance with the teachings of the present invention.

FIG. 2 depicts a system 200 for providing an architecture-independent program implementation using Multicode segments and Intercode function representations. System 200 accepts (as an input) application source code 240 and supplies (as a run-time output) native code for execution on a series of target processors (231, 232, and 233). System 200 includes a series of compilers 203, 204, and 205 for compiling object code from source code 240 and a series of run-time translators 220a, 220b, and 220c for supplying native code for respective target processors (231, 232, and 233). Multicode segment 210 is a compiled intermediate object code format which is supplied to each target processor for run-time translation to an object code format native to the target processor. Individual functions and procedures may be represented as compiled Intercode representations, as compiled code representations native to a target processor (i.e., native code), or as both Intercode and native code representations. Compiled native code representations are directly executed (i.e., no translations is required), while compiled Intercode representations are translated at run-time into native code for execution on the target processor.

FIG. 2 depicts a Multicode segment 210 including three object code modules corresponding to function$_1$ 241. The first module, which is the object code output of the C language compiler for target processor$_1$ (native compiler 203), is native code module 212. The second, which is the object code output of the C language compiler for target processor$_2$ (native compiler 204), is native code module 214. The third, which is the object code output of Intercode compiler 205, is an Intercode module 216. Multicode segment 210 also includes an Intercode module 218 corresponding to function$_2$ 242. Intercode module 218 is the object code output of the Intercode compiler's (205) compilation of C++ function$_2$. The structure of Multicode segments such as Multicode segment 210 and of Intercode modules such as Intercode modules 216 and 218 is described below in greater detail.

Illustratively, system 200 provides each of the three target processors (i.e., target processors 231, 232, and 233) with a copy of Multicode segment 210. Each target processor receives the same Multicode segment as the others on, in, or as part of any suitable distribution media, such as ROM, disc media, CD-ROM, non-volatile RAM, PCMCIA card, etc. Other suitable distribution media will be apparent to those of ordinary skill in the art and provision of a Multicode segment such as 210 to a target processor such as 231, 232, or 233 is by any such suitable medium.

In general, object code native to a target processor can be directly executed on that target processor, or alternatively, an Intercode module can be translated to native code for execution. Since Multicode segment 210 includes a native code representation 212 corresponding to function$_1$ that native code representation (212) is directly executed on target processor$_1$ 231 when function$_1$ is called or invoked. In contrast, Multicode segment 210 does not include an object code representation of function$_2$ which is native to target processor$_1$. As a result, the Intercode module 218 of Multicode segment 210 which corresponds to function$_2$ must be translated to native code by Intercode translator 220a before execution on processor$_1$. Similarly, Intercode module 218 must be translated to native code by Intercode translator 220b before execution on processor$_2$. While Multicode segment 210 includes native code representations of function$_1$ for processor$_1$ and processor$_2$, there is no corresponding native code module for processor$_3$. As a result, both function$_1$ and function$_2$ must be translated by Intercode translator 220c before execution on processor.

In FIGS. 3–8, software structures and encodings are shown which implement Multicode segments. These structures and encodings establish functional interrelationships between a Multicode segment and its component architecture-independent and architecture-dependent representations of code and data. In addition, these structures and encodings establish functional interrelationships between an Intercode translator and the component Intercode object code and data representations of the Multicode segment.

Multicode format is an extensible format for laying out segments of code and data. A program is represented in one or more Multicode segments, such as Multicode segment 210, which, in turn, include Intercode representations of code and data. These Multicode segments can themselves be represented in a suitable container such as a binary data file. Dynamically linked libraries, object representations such as Magic Cap™ objects, etc. are also suitable containers. An Intercode translator (e.g., 220a, 220b, or 220c) does not concern itself with how the Multicode segments are found and instead uses the segments which are made available to it. Code in a Multicode segment can refer to external functions and data by name, and the Intercode translator dynamically links these references to other segments or system libraries.

Multicode Segments

Figure 3:
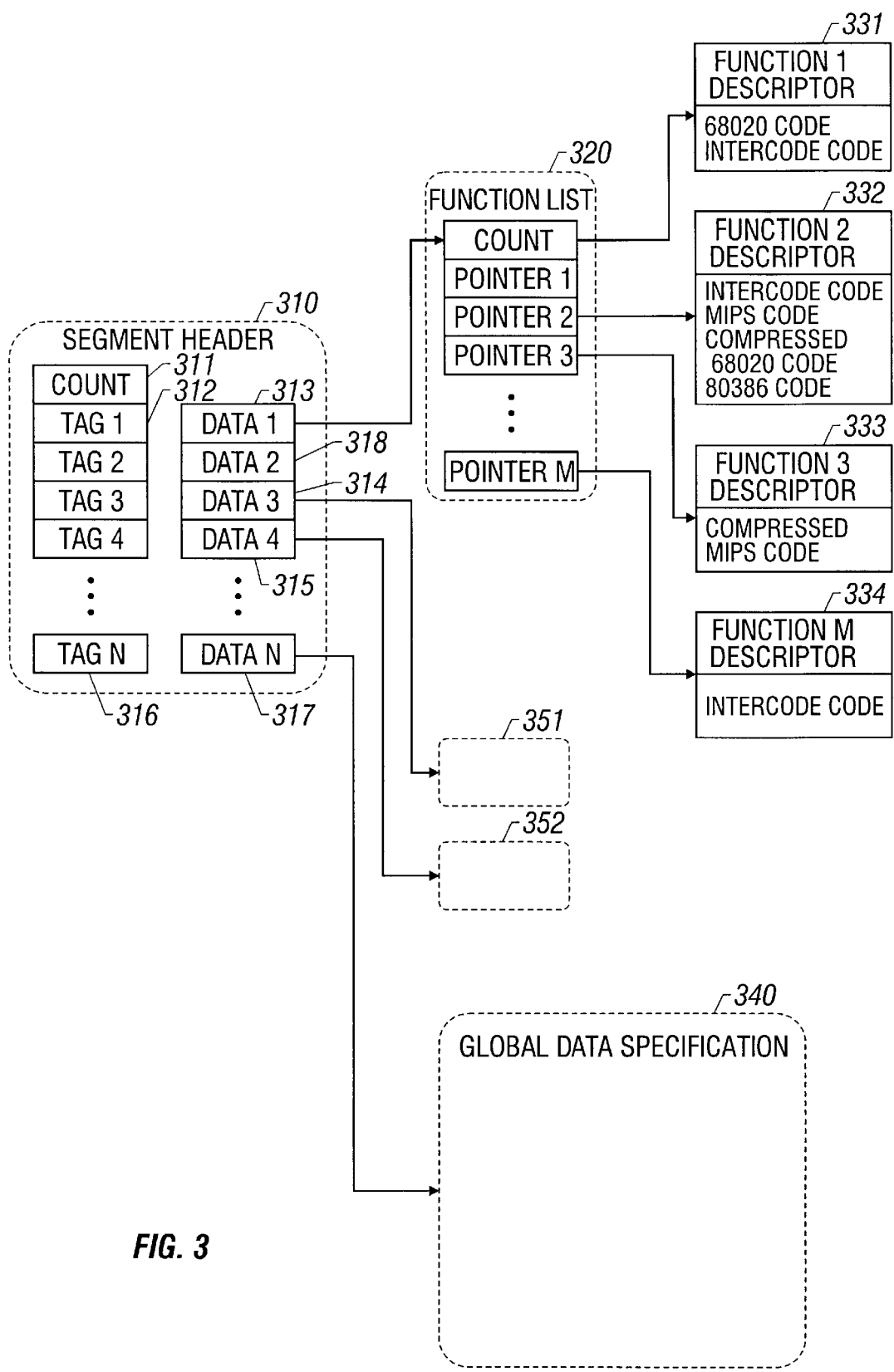
FIG. 3 is a data structure diagram depicting the organization of a Multicode segment for representing object code and data for a machine independent program representation in accordance with the teachings of the present invention.

Referring now to FIG. 3, a typical Multicode segment, illustratively Multicode segment 300, includes a segment header 310, a function list 320, function descriptors (e.g., function descriptors 331, 332, 333, and 334), and a global data specification 340. Segment header 310 includes of an attribute count 311 and a set of attributes. In a presently preferred embodiment, each attribute includes an attribute tag (e.g., 312) and a corresponding data word (e.g., 313), although alternate representations are also suitable. If representation of a particular attribute requires more than 32 bits of data, the data word is a pointer to the attribute data Some attributes are required, while others are optional. Data are represented in big-endian format (most significant byte first) unless otherwise specified, and pointers are actually offsets relative to the beginning of the segment, thus making the segment relocatable. Except for the segment header 310, which, in a presently preferred embodiment, appears at the beginning of the segment, all other components of Multicode segment 300 can appear in an arbitrary order. Alternative embodiments may further relax, or additionally constrain, the ordering and/or placement of components in a Multicode segment.

In the embodiment of FIG. 3, segment attribute 313 points to function list 320, which, in a presently preferred embodiment, is structured as a count followed by an array of pointers to function descriptors. A function and its associated function descriptor within a Multicode segment are assigned unique, consecutively assigned virtual function numbers starting with one (1), although alternative conventions would also be suitable. All persistent outside references to functions within the segment use the virtual function numbers rather than direct offsets into the segment. Other segment attributes, illustratively those represented by 314, 340, and 351, describe version information, the global data sections, and entry gates that are needed for code that explicitly takes the address of a function. Still other segment attributes may be defined in a given Multicode segment to specify the segment's symbol table, external linkages, and debugging information.

Notation and Conventions

The following terminology is used throughout this specification to refer to units of storage:

A byte is 8 bits.

A halfword or short is 16 bits.

A word or long is 32 bits.

A doubleword is 64 bits. Plain numbers are decimal. Hexadecimal numbers are preceded by a dollar sign ($), and binary numbers are preceded by a percent sign (%). Leading zeros do not indicate octal numbers in this specification. This terminology is provided solely for the purpose of descriptive consistency, and is not meant as a limitation. Those of ordinary skill in the art will recognize that designs and implementations based on alternate unit of storage definitions are within the spirit and scope of the present invention.

All numbers are stored in big-endian format unless specified otherwise. The relative order of many data structures is undefined, but they should be stored to satisfy the natural alignment requirements of their most restrictive component. In other words, all structures should be aligned on a word boundary, and structures containing a double or a doubleword should be aligned on a doubleword boundary. Components should also be properly aligned within structures.

To optimize for small values, some integers are stored in the bnum format, which includes of one or more bytes as shown in FIG. 4. A bnum is a variable-length representation of integer data. Representations 410, 420, 430, 440, 450, and 460 provide increasing ranges of representable integer values. For example, in bnum representation 410, a single byte encodes values between 0 and 239, whereas in bnum representation 460, a first byte encodes the range (i.e., $-2^{63}$ . . . $2^{63}-1$) and eight subsequent words encode the integer value. Representations 420, 430, 440, and 450 encode intermediate ranges of integer values, providing a gradation of alternatives providing increasing range, albeit with increasing space requirements.

Multicode Segment Attributes

Referring again to FIG. 3, segment header 310 is located at the beginning of a Multicode segment and, in a presently preferred embodiment, has the following structure:

| Offset | Type | Value |
|---|---|---|
| 0 | short | Number n of segment attributes |
| 2 | n × short | Segment attribute tags |
| 2 + 2n | padding | 2 bytes of padding to align to a word boundary if n is even |
| 4 + 4[n/2] | n × long | Corresponding segment attribute data words |

The segment attribute tags (e.g., segment attribute tag 312) are unsigned halfwords and should be defined in ascending numerical order. Attribute data words (e.g., attribute data word 313) follow the segment attribute tags and are arranged in an order corresponding to the segment attribute tags Attribute data words typically provide segment relative pointers to data structures containing the relevant segment attribute data (e.g., attribute data words 314 and 315 point to data structures 351 and 352, respectively). Alternatively, an attribute data word (e.g., attribute data word 318) may itself encode the segment attribute data. Additional segment attributes may be defined as needed and alternative encodings of segment attributes would also be suitable. Suitable alternatives designs for encoding segment attribute data will be apparent to those of ordinary skill in the art.

Together, the segment attribute tags and data words define segment attributes including Version, FunctionList, FunctionNames, MainFunction, ConstructorList, DestructorList, GlobalData, DataExports, and EntryGateList attributes, which are encoded as follows in a presently preferred embodiment:

Version
Tag: $0001
Data: Segment-relative pointer to data below (which should be word-aligned):

| Offset | Type | Value |
|---|---|---|
| 0 | half | Minimum version of translator required to process this segment |
| 2 | half | Version of this segment |

The version attribute provides information about the format of data in the corresponding Multicode segment. The minimum version number is the lowest version number an Intercode translator can have and still translate this segment correctly. The second version number specifies the preferred version of the Intercode translator or other tools. These two numbers may be different in cases where a segment is understandable by an earlier Intercode translator but contains additional information that can be used by later versions of the Intercode translator.

FunctionList
Tag: $0002
Data: Segment-relative pointer to data below (which should be word-aligned):

| Offset | Type | Value |
|---|---|---|
| 0 | long | Number m of function descriptors |
| 4 | m × long | Pointers to function descriptors |

The FunctionList attribute defines an array of m segment-relative pointers (e.g., function list 320) to function descriptors such as function descriptors 331, 332, 333, and 334. Each such segment relative pointer points to a function descriptor for a corresponding function (i.e., functions 1–m). Each function descriptor in turn provides access to at least one function representation, and possibly several alternative function representations, for the function it describes. For example, referring to FIG. 3, function descriptor 352 provides access to Intercode, MIPS, compressed 68020, and 80386 object code representations of function 2. The structure of function descriptors such as 331, 332, 333, and 334 is described in the Multicode Function Descriptors section below.

Referring back to FIG. 2, an Intercode translator implementation, such as Intercode translator 220a, 220b, or 220c) is free to choose any of the code representations it recognizes. It should, however, make the choice consistently. Calling a system function is preferred when it is available, followed by calling native code if available for the particular target processor. If all else fails, and if an Intercode representation is present, the Intercode instructions of the function's Intercode representation are translated into native code for execution on the target processor.

FunctionNames
Tag: $0003
Data: Segment-relative pointer to data below (which should be byte-aligned):

| Type | Value |
|---|---|
| name list | See below |
| name list | See below |
| ... | |
| name list | See below |
| byte | 0 |

The FunctionNames attribute's data includes of zero or more lists of function names, terminated by a zero byte. Each list of function names describes the names of a series of functions with consecutive numbers and has the format below. Each name is an arbitrary byte string. If a name is an ASCII character string, it is not null-terminated. If the length n of some function name is zero, the name is assumed to not exist.

| Type | Value |
|---|---|
| bnum | Initial function number k |
| bnum | Number of functions in range m |
| bnum | Length $n_k$ of name of function k |
| $n_k$ characters | Name of function k |
| bnum | Length $n_{k+1}$ of name of function k + 1 |
| $n_{k+1}$ characters | Name of function k + 1 |
| ... | |
| bnum | Length $n_{k+m-1}$ of name of function k + m − 1 |
| $n_{k+m-1}$ characters | Name of function k + m − 1 |

MainFunction
Tag: $0004
Data: Segment-relative pointer to data below (which should be word-aligned):

| Offset | Type | Value |
|---|---|---|
| 0 | long | Number of main function in segment |

MainFunction is an optional attribute that describes the main entry point to the Multicode segment. The assembler portion of a compiler such as native compiler 203, native compiler 204, or Intercode compiler 205 will output a MainFunction record if it encounters a . main directive and a function with a matching name (typically main).

ConstructorList
Tag: $0005
Data: Segment-relative pointer to data below (which should be word-aligned):

| Offset | Type | Value |
|---|---|---|
| 0 | long | Number m of constructor numbers |
| 4 | m × long | Function numbers of constructors |

Constructors are called when the Multicode segment is attached in the same order as they are given. Each entry in the constructor table is actually a number of the function to be called.

DestructorList
Tag: $0006
Data: Segment-relative pointer to data below (which should be word-aligned):

| Offset | Type | Value |
|---|---|---|
| 0 | long | Number m of destructor numbers |
| 4 | m × long | Function numbers of destructors |

Destructors are called when the Multicode segment is detached in the reverse order as they are given. Each entry in the destructor table is actually a number of the function to be called.

GlobalData
Tag: $0008
Data: Segment-relative pointer to global data specification If the Multicode segment includes any global data or constants, the segment includes a GlobalData attribute which points to a list of global data section descriptors, the format of which is described in the Multicode Data Sections section below.

DataExports
Tag: $0009
Data: Segment-relative pointer to data export specification If the Multicode segment exports any global data or constants for other segments, the segment includes a DataExports attribute which points to a list of exported global variables. Those skilled in the art will recognize a variety of appropriate formats.

EntryGateList
Tag: $000B
Data: Segment-relative pointer to data below (which need only start byte-aligned):

| Type | Value |
|---|---|
| bnum | Number n of entry gates |
| byte | Number k of bits in a function number; must be 0, 8, 16, or 32 |
| | Optional padding to align to a k-bit boundary |
| n × k bits | Table of function numbers indexed by entry gate numbers 0 ... n − 1 |

Entry gates are needed for explicitly taking addresses of functions that are not directly executed out of the Multicode segment image. Each entry gate is a compact, nonrelocatable piece of code in a Multicode segment's global data area that either jumps to the taanslated function's code or calls the translator to translate the function and then jump to it. A function needs an entry gate only if an explicit pointer to the function is required; merely calling a function (except through an indirect pointer) does not require an entry gate.

Entry gates in a Multicode segment are assigned consecutive numbers from 0 to n−1, inclusive. The EntryGateList table maps gate numbers to function numbers. To save space and time, an alternate mapping between function numbers and entry gate numbers may be used. Under this mapping, functions 1 through n are assigned gates 0 through n−1, respectively, while the remaining functions do not have gates. When this mapping is used, k must be set to zero, and the table of function numbers indexed by entry gate numbers can be omitted.

Multicode Function Descriptors

Figure 5:
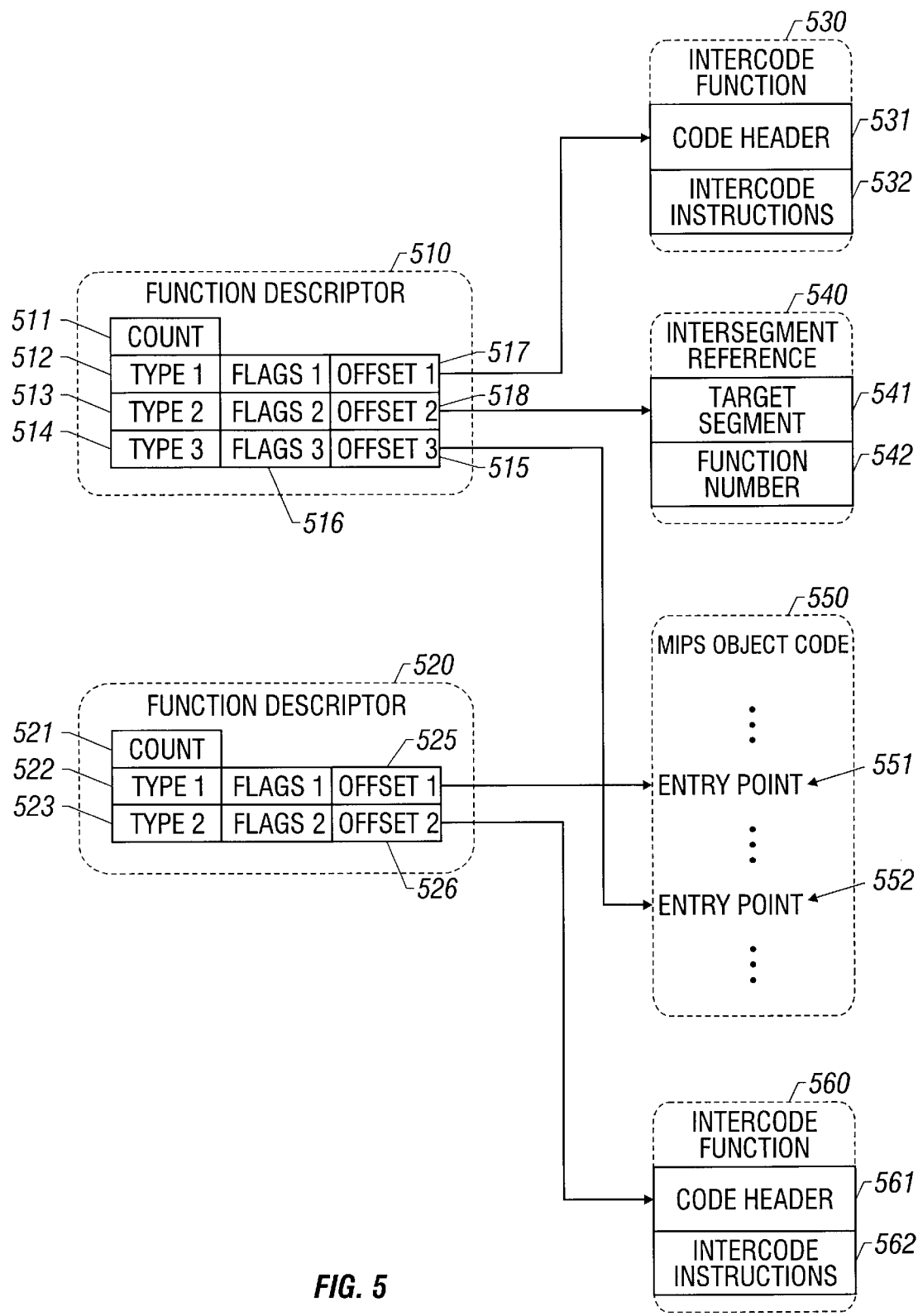
FIG. 5 is a data structure diagram depicting the functional interrelationship between function descriptors and object code representations in a Multicode segment constructed in accordance with the teachings of the present invention.

Function descriptors can be located anywhere in a Multicode segment. FIG. 5 illustrates the structure of a pair of function descriptors (510 and 520), each of which includes a representation count, as follows:

| Type | Value |
|------|-------|
| bnum | Number n of function representations |

Functionally descriptive information for each of the n function representations follow. In a presently preferred embodiment, these blocks of functionally descriptive information have the following format:

| Type | Value |
|------|-------|
| bnum | Code type |
| bnum | Flags |
| bnum | Offset from function descriptor to function header or entry point |

Thus, in the exemplary embodiment of FIG. 5, function descriptor 1 (510) includes a count 511 value indicating that three blocks of functionally descriptive information (512, 513, and 514) follow, one for each of three alternative representations of function 1, i.e., for an Intercode representation 530, for a MIPS code representation at a first entry point 552 within MIPS code block 550, and for an inter-segment reference 540 to a representation of unspecified type residing in another Multicode segment. Function descriptor 2 includes two blocks of functionally descriptive information identifying two alternative representations of function 2, i.e., a MIPS code representation at a second entry point 551 within MIPS code block 550 and an Intercode representation 560.

Within a given function descriptor (such as 510 or 520), blocks of functionally descriptive information are preferably ordered according to preferred code type, i.e., from most preferred code type to least preferred code type, although alternative orderings are also possible. An Intercode translator will prefer native code representations over an Intercode representation and ordering the blocks of functionally descriptive information in accordance with the preferences of an Intercode translator simplifies the translator's selection of a representation. Code types include:

| Code Type | Architecture |
|-----------|--------------|
| $00 | Reserved |
| $01 | External reference |
| $02 | Inter-segment reference |
| $03–$0F | Reserved |
| * $10 | Intercode |
| $18–$1F | Reserved |
| * $20 | MIPS Rxx00 |
| * $28 | Motorola 680x0 |
| * $30 | PowerPC |
| * $38 | 80x86 | wherein, code types marked with an asterisk (*) are actually families of eight code types. Additional encoding provides description within a family of code types. For example, the code type, c=$20, indicates MIPS code which is uncompressed, pure, integer code. In this context, pure code is code that does not rely on the current run-time system calls or global variables as defined for a particular processor. Code type c+1, such as $21, indicates pure code that also uses a floating-point unit. Code types c+2 and c+3 respectively indicate integer code and floating-point code, each of which may also call system-level services. Code types c+4 through c+7 are similar to code types c through c+3, respectively, except that they are either compressed or require relocation or linking. Those skilled in the are will recognize many suitable variations on and additions to the above encodings. For example, additional code types may be defined to support other processor architectures. Code type definitions are any such suitable encodings; however, the range of code types should be kept dense to allow fast dispatch by an Intercode translator.

Each block of functionally descriptive information includes flags fields (e.g., the flags field 516 of function descriptor 510). The flags fields, each of which are associated with a particular function representation, indicate the variants of a processor architecture which are supported by the associated function representation. For example, flags 516, which are associated with the function representation at entry point 552 of MIPS object code block 550, indicate the set of MIPS processor variants supported by the object code at entry point 552. Flags fields are represented within a bnum as a map of bits, each of which, when set, indicates that the object code of the associated function representation can run on the corresponding variant of the processor architecture. Some code can run on several variants, in which case multiple bits of the flags field are set. If processor architecture variant v2 is a superset of variant v1, then setting bit v1 implies that the code will run on variant v2, regardless of whether bit v2 is set or not. In this way, a new architecture variant can be defined which will continue to run existing Multicode segments.

In a presently preferred embodiment, processor architecture variant bit definitions are specific to each processor architecture and are defined as listed below. Undefined bits are set to zero.

External reference variants (code type $01):
    0    Must be set for current external reference format
Inter-segment reference variants (code type $02):
    0    Must be set for current inter-segment reference format
Intercode variants (code types $10–$17):
    0    Must be set for current Intercode format
MIPS R xx 00 variants (code types $20–$27):
    0    R2000
    1    R3000
    3    R4000
    5    Dino
    6    Dino with load interlocks
Motorola 680 x 0 variants (code types $28-$2F):
    0    68000
    1    68020 (with 6888½ for code types $29, $2B, $2D, $2F)
    2    68040
    3    68060
    6    68349
PowerPC variants (code types $30–$37):
    0    601
    1    603
    2    604
    3    620
    6    821

-continued

80 × 86 variants (code types $38-$3F):
- 0    8086
- 1    80286 (with 80287 for code types $39, $3B, $3D, $3F)
- 2    80386 (with 80387 for code types $39, $3B, $3D, $3F)
- 3    80486
- 4    Pentium If bit 0 of the flags bnum in the function descriptor is not set for an Intercode, external reference, or inter-segment reference function representation, then an Intercode translator assumes that the format of the representation is an unknown extension and the function representation is not processed.

Function Representations

Referring again to the several function representations shown in FIG. 5, offset fields (e.g., 515, 517, 518, 525, and 526) provide an offset (within the Multicode segment) from the function descriptor to an entry point or to functionally descriptive information (e.g., a code header or intersegment reference) for an associated function representation. An Intercode translator, illustratively, Intercode translator 220a, 220b, or 220c of FIG. 2, follows the offset to find a selected representation of object code for a particular function.

For a native representation (i.e., a machine language representation) of a function, the offset in the function descriptor (illustratively, offset 515) points to the function's entry point within a block of native code (illustratively, MIPS object code block 550). The native representations of additional functions, if any, which are also represented in the block of native code are identified by corresponding entry points (e.g., by offset 525 identifying entry point 551).

For an Intercode representation (code $10) of a function, the offset identifying an Intercode function representation (illustratively, offset 517) points to the header (illustratively, header 531) of an Intercode function representation (illustratively, 530). An Intercode function header such as 531 includes functionally descriptive information for use by an Intercode translator in translating the associated Intercode instructions (i.e., Intercode instructions 532) to object code which is native to a particular target. Intercode instructions are described in the Intercode Instructions section below.

For an external reference (code type $01), the offset points to the name of the function, encoded as a bnum followed by the actual name, which can be an arbitrary byte string. If the name is an ASCII character string, it is not null-terminated.

| Type | Value |
| --- | --- |
| bnum | Length n of name |
| n characters | Name |

For an inter-segment reference (code type $02), the offset points to the number of the referenced segment and the number of the function within the segment:

| Type | Value |
| --- | --- |
| bnum | Target segment number |
| bnum | Function number in target segment |

Multicode Data Sections

Figure 6:
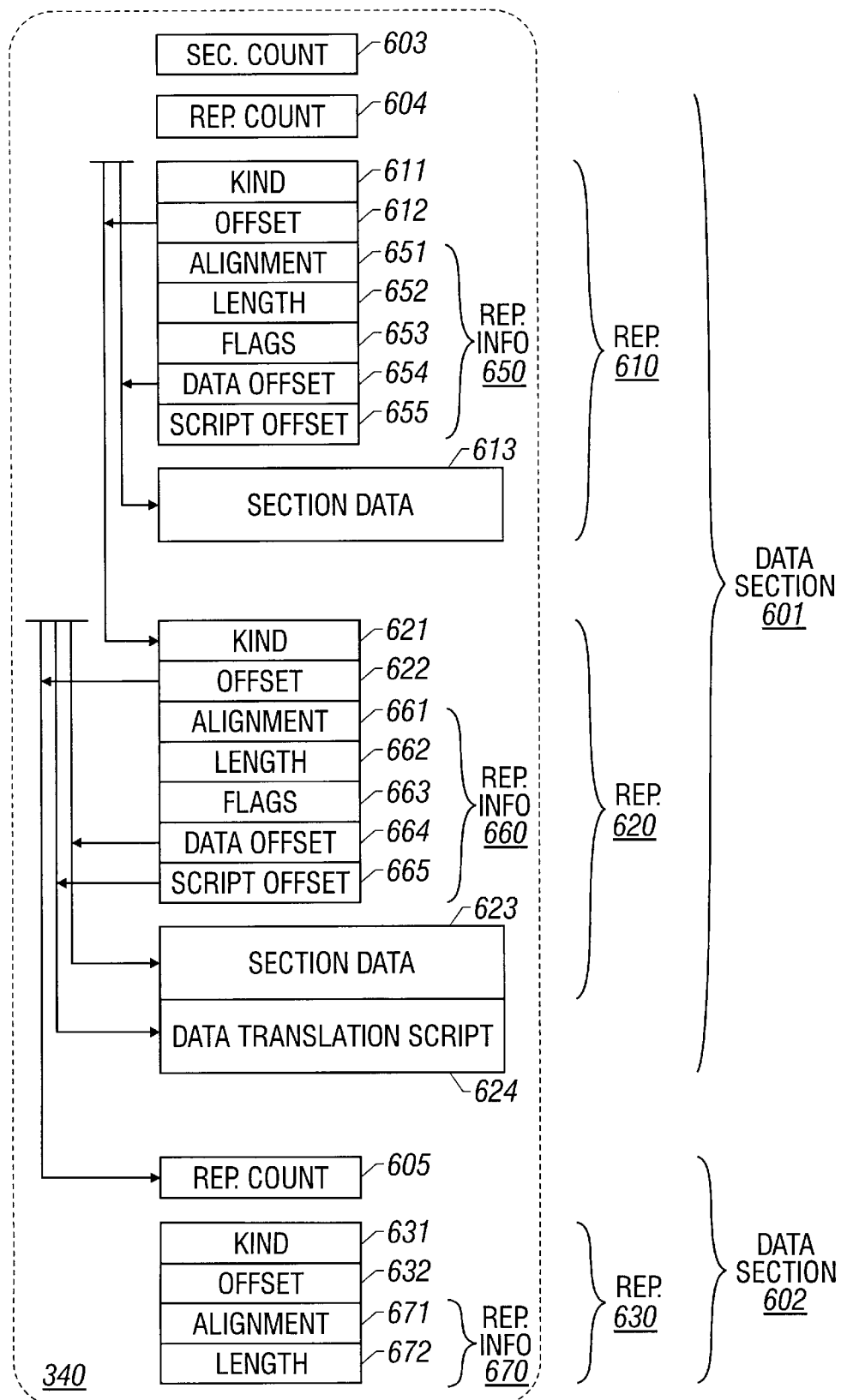
FIG. 6 is a data structure diagram depicting the functional interrelationships between multiple representations of section data in a global data specification for a Multicode segment constructed in accordance with the teachings of the present invention.

Referring back to FIG. 3, the GlobalData segment attribute (e.g., segment attribute tag 316 and data word 317) points to a global data specification 340 which includes representation information, section data, and data translation scripts associated with section data. Referring to FIG. 6, a global data specification, such as global data specification 340, is organized as a series of data sections (illustratively, a pair of global data sections 601 and 602). A global data specification such as 340 is byte-aligned and starts with a section count:

| Type | Value |
| --- | --- |
| bnum | Number n of data sections | which is shown in FIG. 6 as data section count 603. The n section descriptors, numbered 1 through n, respectively, follow. FIG. 6 illustrates a global data specification 340, which includes two data section descriptors, illustratively, data section 1 and 2 descriptors 601 and 602. Each data section descriptor has the following format:

| Type | Value |
| --- | --- |
| bnum | Number of representations |
| byte | Representation kind |
| bnum | Offset from representation kind byte to next representation |
| ... | Representation information |
| byte | Representation kind |
| bnum | Offset from representation kind byte to next representation |
| ... | Representation information |
| ... | |
| byte | Representation kind |
| bnum | Offset from representation kind byte to next section |
| ... | Representation information |

A data section can have zero or more representations. For example, FIG. 6 shows a first data section 601 including two representations (610 and 620) and a second data section 602 including a single representation 630. A section with no useful representations is encoded as $00.

Illustrating the structure of a global data specification in the context of FIG. 6, global data specification 340 begins with a section count 603 indicating that two data sections (601 and 602) are represented. The first data section (601) includes two representations (610 and 620), whereas the second data section (602) includes a single representation (630). Representation counts 604 and 605 respectively encode the number of representations for their respective data sections. Global data specifications having larger or smaller numbers of data sections and/or representations are of analogous structure.

Representation information associated with each representation of each data section describes the data representation included therein. For example, in the first data section, representation information 650 and 660 include information functionally descriptive of their respective representations of section data (i.e., functionally descriptive of section data 613 and section data 623, respectively). Representation 610 and representation 620 are alternative representations of a data section having initial data values. In particular, section data 613 and 623 are alternate encodings of the same underlying data and representation information 650 and 660 identify the particular encodings. Representation 620 also includes a data translation script (624) corresponding to section data 623, whereas representation 610 has no such script.

Data section 602 includes a single representation (630) and is illustrative of a data section for which explicit representation of the underlying section data is unnecessary (e.g., a uninitialized or zero data section). Representation information 670 for data section 602 is more limited.

An Intercode translator has freedom to choose any of the data section representations it understands and is able to use. For example, an Intercode translator (such as Intercode translator 220a of FIG. 2) may select representation 610 or representation 620 of data section 601. Some representations (illustratively, representation 610) may be specific to a subset of architectures such as those in which data is represented in little-endian format. In such a case, another representation should also be present to support big-endian architectures. Other representations (illustratively, representation 620), may include a translation script (such as 624) for transforming section data to a format compatible with a target architecture of either endian-type. The following representation kinds are defined for a presently preferred embodiment of a Multicode data section:

| UninitData |  |
|---|---|
| Kind: $01 |  |
| Additional representation information: |  |
| Type | Value |
| byte | Base-2 logarithm of required data alignment |
| bnum | Data length |

An UninitData representation indicates that the initial values of the data in the section are arbitrary. The logarithm of the required data alignment is the number of least-significant bits in the address of the section that should be zero—b 0means byte alignment, 1 halfword, 2 word, 3 doubleword, 4 means 16-byte alignment, etc. Data length is the number of bytes of data the section is describing. Representation 630 of FIG. 6 is illustrative of the structure of an UninitData representation. Because initial values are arbitrary, no explicit encoding of values is included. Instead, an Intercode translator encountering a UninitData representation (illustratively, representation 630) simply creates an block of uninitialized data in accordance with the alignment 671 and length 672 fields of the associated functionally-descriptive, representation information 670.

| ZeroData |  |
|---|---|
| Kind: $02 |  |
| Additional representation information: |  |
| Type | Value |
| byte | Base-2 logarithm of required data alignment |
| bnum | Data length |

A ZeroData representation indicates that all bytes in the section are to be cleared to zero. The additional representation information is the same as for an UninitData representation. Representation 630 is therefore similarly illustrative of the structure of a ZeroData representation. Because the initial values for a ZeroData representation are all equal to zero (i.e., because all component bytes of a represented data structure are representable as $00 regardless of the particular data structures represented and regardless of the byte-ordering convention of the target machine architecture) no explicit encoding of values is included. Instead, an Intercode translator encountering a ZeroData representation (illustratively, representation 630) simply creates an block of zeros in accordance with the alignment 671 and length 672 fields of the associated functionally-descriptive, representation information 670.

| ExternalData |  |
|---|---|
| Kind: $03 |  |
| Additional representation information: |  |
| Type | Value |
| repskip bytes | Name |

An ExternalData representation indicates that the section's address is obtained from some other segment or source that exports data with the given name, which can be an arbitrary byte string. If it is an ASCII character string, it is not null-terminated.

| InitData |  |
|---|---|
| Kind: $04 |  |
| Additional representation information: |  |
| Type | Value |
| byte | Base-2 logarithm of required data alignment |
| bnum | Data length |
| bnum | Representation flags |
| bnum | Offset from representation kind byte to section data |
| bnum | Offset from representation kind byte to data translation script or 0 if none |

An InitData representation provides the initial data values for a data section together with functionally-descriptive representation information which enables an Intercode translator (such as Intercode translator 220a of FIG. 2) to select, and optionally transform, an appropriate representation for its target architecture. Referring to FIG. 6, representations 610 and 620 are each illustrative of the structure of an InitData representation. As with the UninitData and ZeroData representations previously described, the representation information of an InitData representation (e.g., representation information 650 and 660 of representations 610 and 620, respectively) begins with alignment and length information. However, unlike the previously described representations, an InitData representation also includes an explicit encoding of initial data values (e.g., section data 613 and 623 at data offsets 654 and 664, respectively), flags functionally-descriptive of the explicit encodings (e.g., flags 653 and 663), and an optional data translation script (e.g., data translation script 624) that is functionally-descriptive of the underlying structure of associated section data. In a presently preferred embodiment, a data translation script (such as data translation script 624) provides an Intercode translator with a series of directives describes how to transform the initial value encodings of the associated section data (illustratively, section data 623) in accordance with the byte ordering convention of a target processor. The directives of a data translation script implement transformations of associated section data, including byte-ordering and relocation related transformations of data implementing pointers. The structure and organization of a data translation script is described in the Data Translation Script section below.

Representation information flags (illustratively, flags 653 and 663) of an InitData representation encode functionally-descriptive information for use by an Intercode translator in selecting and optionally transforming associated section data. In particular, flags 663 encode information descriptive of the byte ordering format of section data 623 and encode information descriptive of the directives of data translation script 624. In a presently preferred embodiment, representation flags of an InitData representation are implemented as the logical union of the following component flags:

| | |
|---|---|
| $01 | Set if data is in the big-endian format |
| $02 | Set if data is in the little-endian format |
| $04 | Set if data translation script provides byte ordering information |
| $08 | Set if data translation script contains relocations |
| $10 | Set if section is read-only | although suitable alternate encodings are also possible and will be appreciated by those of ordinary skill in the art. Additional flags may also be defined.

If the section data of a given representation includes only bytes (i.e., includes no multibyte units of storage) and/or values, such as zeros, whose representation is endian-independent regardless storage size, then both the $01 and $02 flags may be set. If a data translation script is present but the $04 flag is clear, then the data translation script may not properly reflect the sizes of individual data items other than relocations—for instance, two words may be listed as eight bytes. A section is read-only if its data is never altered after relocations are resolved. Read-only sections may be placed in ROM if they do not contain any relocations or write-protected memory if they do. Also, read-only sections may, but do not have to be, shared among several data worlds.

The section data and data translation script associated with a particular representation can appear anywhere in the segment. Data offset and script offset representation information (illustratively, data offset 664 and script offset 665) respectively provide offsets to section data and to the associated data translation script. In a presently preferred embodiment, such offsets are relative to the kind byte of the associated representation (illustratively kind byte 621 of representation 620), although many alternate referencing configurations will be appreciated by those of ordinary skill in the art. Both section data and data translations scripts (e.g., 623 and 624) may follow the additional representation information (possibly with padding for alignment), in which case repskip should be adjusted to point past the data and data translation script. Alternatively, the section data and data translation scripts for all data sections (illustratively, section data 613 and 623 and data translation script 624) may be collected at the end of global data specification 340.

Section data (e.g., section data 613 and 623) should be aligned on the same boundary as given in the associated data alignment byte (651 and 661, respectively). If the associated data translation script (e.g., data translation script 624) indicates that the section data contains any halfwords, the data alignment byte must indicate at least a halfword alignment; similarly, if the data translation script indicates that the section data contains any words, the data alignment byte must indicate at least a word alignment, and so on.

CompressedData
Kind: $05
Additional representation information:

| Type | Value |
|---|---|
| byte | Base-2 logarithm of required data alignment |
| bnum | Data length |
| bnum | Representation flags |
| bnum | Offset from representation kind byte to compressed section data |
| bnum | Offset from representation kind byte to data translation script or 0 if none |

Like the InitData representation described above, a CompressedData representation provides the initial data values for a data representation together with functionally-descriptive representation information which enables an Intercode translator (such as Intercode translator 220a of FIG. 2) to select, and optionally transform, an appropriate representation for its target architecture. The structure of a CompressedData representation is similar to that of an InitData representation except that the associated section data is compressed in accordance with a suitable compression algorithm. An Intercode translator must decompress the section data and then translate the decompressed data in accordance with an associated data translation script, if provided.

Suitable compression/decompression algorithms are well known to those of ordinary skill the art and the algorithms employed in any particular embodiment are any of such suitable algorithms. Unlike InitData, the compressed section data is not subject to alignment restrictions; however, an Intercode translator must obey the alignment specified in the representation flags when it decompresses the data.

Data Translation Script

Figure 7:
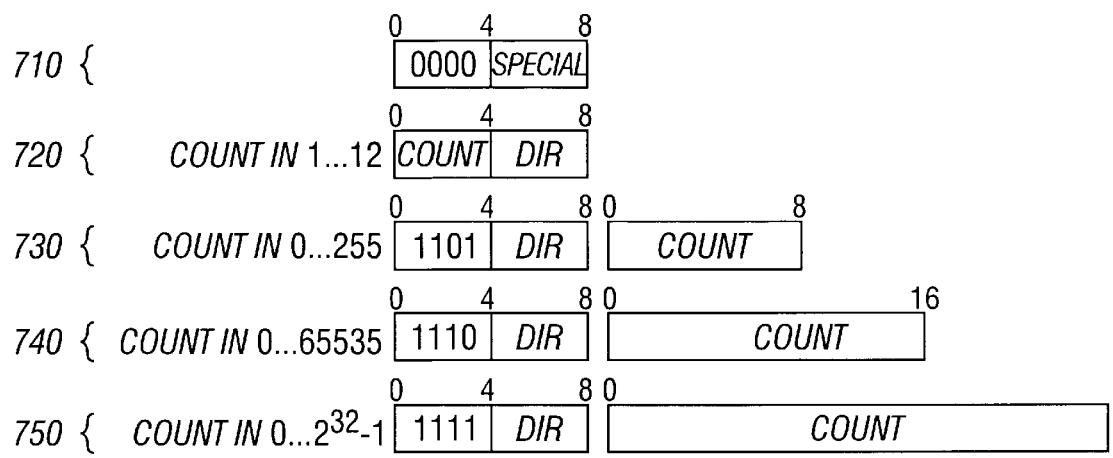
FIG. 7 is a pictorial illustration of multiple encoding formats for data translation directives and special directives of a data translation script in accordance with the teachings of the present invention.

Data translation scripts, such as data translation script 624, provide information functionally descriptive of associated section data for use by an Intercode translator (illustratively, Intercode translator 220a) in converting literal data represented in big-endian format into little-endian format (or vice versa), and in relocating pointers to data or code sections. In a presently preferred embodiment, data translation script 624 is organized as a sequence of instructions, each of a format shown in FIG. 7. The instruction formats depicted in FIG. 7 are variable-length instruction formats defining a set of transformations and relocations and defining simple flow control mechanisms for efficiently describing transformations and relocations for arbitrary data structures. A data translation script such as data translation script 624 includes a sequence of such instructions which, in a presently preferred embodiment, are selected from sets of special directives (special) and data translation directives (dir).

As shown in FIG. 7, special directives are of fixed length, whereas data translation directives are represented using variable length encodings. The format of a special directive is shown in encoding 710. Variable length data translation directives are shown as encodings 720, 730, 740, and 750. Each of the data translation directives includes a repeat count (count) which allows an Intercode translator to repeat the particular translation for multiple subsequent storage locations, e.g., for each of N words in an array. Variable length encoding of data translation directives allows efficient encodings tailored to the magnitude of the desired repeat count value. Instructions and repeat counts need only be aligned on byte boundaries.

In a presently preferred embodiment, the following special directives are defined:

| | |
|---|---|
| $0 | End translation |
| $1 | Endblock |
| $2* | Relocate byte (8 bits) |
| $3* | Relocate halfword (16 bits) |
| $4* | Relocate word (32 bits) |
| $5* | Relocate doubleword (64 bits) |
| $6* | Relocate quadword (128 bits) |

In a presently preferred embodiment, the data translation directives are defined:

| | |
|---|---|
| $0 | Begin block |
| $1* | Relocate word (32 bits) |
| $2 | Translate byte (8 bits) |
| $3 | Translate halfword (16 bits) |
| $4 | Translate word (32 bits) |
| $5 | Translate doubleword (64 bits) |
| $6 | Translate quadword (128 bits) |
| $8 | Translate single-precision floating point (32 bits) |
| $9 | Translate double-precision floating point (64 bits) |
| $A | Translate extended-precision floating point (80 bits) |
| $B | Translate quadruple-precision floating point (128 bits) |

The dir field of each data translation directive specifies the unit of storage to be translated, while count specifies how many of such units are to be translated. Translation by an Intercode translator may require reversing byte ordering within each unit of storage to translate data from a big-endian section onto a little-endian machine (or vice versa). The data translation script does not encode whether or not byte order reversal is required, but rather provides an Intercode translator, such as Intercode translator 220*a* shown in FIG. 2, with information functionally descriptive of the structure of associated section data.

Translation of Literal Data

For literal data represented in the section data 623 of representation 620, data translation script 624 provides an Intercode translator with translation instructions for transforming byte ordering within the section data on a unit-of-storage by unit-of-storage basis (if required for the particular target processor). In this way, literal data of arbitrary structure can be specified independent of endian format.

As previously described, the representation flags of an Initdata (or a CompressedData) representation (illustratively, flags 663 of representation 660) encode the endian format of the representation. Since each Intercode translator implementation (e.g., Intercode translator 220*a*, 220*b*, or 220*c*) is associated with a particular target architecture of known endian-format, detection of an endian-format mismatch by the Intercode translator at translation time is straightforward and a variety of suitable designs will be apparent to those of ordinary skill in the art. For example, command line options, compile time switches (#define), configuration files, etc. are all suitable designs for encoding the endian format of the target architecture. In a presently preferred embodiment, an Intercode translator compares a compiled in target endian format to the flags of the selected data section representation to determine whether byte reversal in accordance with the functionally descriptive information of the associated data translation script is necessary.

Often it is space efficient to encode the aggregate sequence of transformations (i.e., translations and relocations) for a given data structure using a block of instructions which are repeated by the Intercode translator. This block approach can be particularly efficient for encoding transformations of highly regular data structures. The begin and end block instructions are provided for this purpose. A block of instructions to be repeated should be preceded by a begin block instruction (which takes a repeat count) and followed by an end block instruction. For example, to describe the translation of a data structure which includes 128 records each including 4 bytes and a word, i.e., in C syntax

```
struct example_struct {
    char aaaa[4];
    int bbbb;
} example[128];
``` the data translation script associated with section data contaning the data structure would include the sequence data translation directives:

$D0 $80 $42 $14 $01, where the bytes $D0 and $80 encode a begin block data translation directive encoded in accordance with encoding format 730 and having a repeat count of 128. Byte $01 encodes the end of block special directive and bytes $42 and $14 respectively encode translations of the bytes and the word contained in each record. Data translation directive $42 is in accordance with the with encoding format 720 and encodes a repeat count of 4. In a presently preferred embodiment, blocks can be nested up to fifteen levels deep, although provisions for greater or fewer nesting levels will be apparent to those of ordinary skill in the art.

Relocation of Pointer Data

For pointer data represented in the section data 623 of representation 620, data translation script 624 provides the Intercode translator with relocation directives for transforming pointer data values to effective memory addresses: Certain of the special directives and data translation directives listed above implement relocations rather than translations. These relocation directives, which are marked with *'s in the above list, are similar to translations except that a computed value is added to the value or values present in the associated section data 623. The computed value is given by a relocation expression (ref) which immediately follows the relocation directive and count, if any.

Relocation expressions compute a linear combination of relterms, where each relterm may include constants, data section addresses, function gate addresses, and translation time constants. The translation time constants evaluate to a first value if evaluated on a little-endian target processor and to a second value if evaluated on a big-endian target processor. In this way, pointer data values can be specified independent of actual runtime location of the data to which the pointer operand refers and independent of endian format. A data translation script which includes a sequence of instructions, i.e., translations directives (described above) and relocation directives and expressions, allows for endian-independent representation arbitrary data structures which include both literal and pointer data.

A relocation directive, such as the relocate byte special directive (encoded in a presently preferred embodiment as $2, as described above) includes a relocation expression (or rel) which itself includes one or more relterms. FIG. 8A depicts an illustrative relocation expression 810 which includes a series of relterms (811, 812, and 813). FIG. 8B depicts variable length relterm encodings 821, 822, 823, 824, 824, 826, 827, and 828. In a presently preferred embodiment, each relterm except the last includes a 1 leading bit, while the last one (relterm 813) includes a 0 leading bit. Alternative encodings for marking the end of a relocation expression are also suitable and will be apparent to those of ordinary skill in the art.

The value of a relocation expression, such as relocation expression 810, is the sum of the values of its included relterms (except for scaling factor relterms, which are described below). In general, arbitrary linear combination of section addresses, function gate addresses, constants, and translation time constants can be represented in a relocation expression, although only one relterm is needed for most relocations. Relocation expressions may also appear in Intercode instructions (as described below).

Each relterm is represented in accordance with one of the encodings shown in FIG. 8B. The first bit, c, of each encoding describes whether any more relterms follow. The next three bits describe the size of the relterm's argument, i.e., arg field. In a presently preferred embodiment, the %111 encoding is reserved and the %001 encoding is not allowed in rels present in data translation scripts in order to maintain byte boundary alignment The base field describes how the argument (arg) should be interpreted. The argument itself follows, and is between zero and 64 bits long. The following base field encodings are defined:

| | |
|---|---|
| %0000 | arg |
| %0001 | arg + sec(1) |
| %0010 | arg + sec(2) |
| %0011 | arg + sec(3) |
| %0100 | arg + sec(4) |
| %0101 | arg + sec(5) |
| %0110 | arg + sec(6) |
| %0111 | arg + sec(7) |
| %1000 | sec(arg) |
| %1001 | gate(arg) |
| %1010 | staticrel(arg) |
| %1011 | reserved |
| %1100 | reserved |
| %1101 | reserved |
| %1110 | reserved |
| %1111 | (scaling factor relterm) multiply value of next relterm by arg-1 | where sec(n) is the starting address of data section n, gate(n) is the entry gate (or entry point if the function is not cached) address of gate n, and staticrel(arg) is a translation-time expression described below. The %1111 (scaling factor relterm) encoding causes the value of the following relterm to be multiplied by arg−1. In a presently preferred embodiment, the scaling factor is arg−1 instead of arg so that the most common factor, −1, can be encoded as 0. A scaling factor relterm should not be the last relterm and should not be followed by another scaling factor relterm. The staticrel encoding allows endian independent representation of pointer data.

By using several relterms it is possible to construct simple relocation expressions which are linear combinations of constants, data section addresses, function gate addresses, and translation-time constants. An Intercode translator, such as Intercode translator 220a, 1. evaluates the relterms (including scaling factor relterms) of the relocation expression associated with a pointer value encoded in the section data (illustratively, a pointer value in section data 623),
2. calculates the sum of relterms,
3. adds the sum of the relterms to the pointer value, and
4. supplies this sum as the initial pointer value for the target processor.

Endian independence of pointer data representations is provided by the staticrel relterm (encoding %1010) which allows the encoding of an endian sensitive component in the relocation expression. A staticrel relterm evaluates to either zero or an integer constant v depending on a translation-time condition. In a presently preferred embodiment, the value of v is set to the low five bits of arg plus one. The remaining bits of arg select the condition. The conditions selected by the remaining bits of the static relterm (i.e., bits 0–2 of a relterm in accordance with encoding 823) are as follows:

0 evaluates to v if running on a little-endian implementation, or 0 if big-endian 1 evaluates to v if running on a big-endian implementation, or 0 if little-endian.

Thus, a staticrel relterm having an arg of $23 evaluates to 4 when evaluated by an Intercode translator on a big-endian implementation and evaluates to 0 on a little-endian implementation. Significantly, such a staticrel relterm provides the endian sensitive component of a relocation expression for encoding a memory offset to the low-order word of a doubleword.

Like a data translation directive which encodes functionally descriptive information for literal data transformations, a relocation directive (together with the relterms of its associated rel expression) of a data translation script (e.g., data translation script 624) encodes the functionally descriptive information which enables an Intercode translator to transform pointer data in accordance with the endian format of the target processor.

The encoding of translation and relocation directives which make up data translation scripts such as data translation script 624 is illustrative. Similarly, the set of such directives defined herein is also illustrative; larger or smaller number of directives may be defined, more or less complex flow control directives may be provided, and additional (or alternate) storage unit definitions may be supported. Suitable alternative directive formats and directive sets will be apparent to those of ordinary skill in the art; and data translation script 624 includes translation and/or relocation directives of any such suitable formats and set definitions.

The data translation script ends with a $00 byte and the data translation script should translate exactly the number of bytes that are represented in the section data for which the script is functionally descriptive.

Intercode Instructions

Figures 9A, 9B:
FIG. 9A is a pictorial illustration of an Intercode instruction in accordance with the teachings of the present invention.
FIG. 9B is a pictorial illustration of literal operand encodings for Intercode instructions in accordance with the teachings of the present invention.

Each Intercode instruction consists of an opcode followed by operands, if any. In a presently preferred embodiment, the opcode encoding is sufficient to determine what operands will follow. Intercode instructions are packed on bit boundaries in big endian layout (i.e., starting from the most significant bit of the first byte of code). The last instruction should be END and an Intercode function should not contain unreachable code except possibly for floating point rounding mode (FRMODE) or END instructions. In the embodiment of FIG. 9A, each opcode is encoded in 8 bits and determines the Intercode instruction and operand format. Such encoding simplifies the design on an Intercode translator such as 220a, 220b, or 220c. Nonetheless, alternative embodiments may encode opcodes using larger or smaller numbers or bits, or may separately encode operand format.

Literal Operands Encodings

Operand encodings follow Intercode opcodes in-line as part of an Intercode instruction sequence. In particular, such operand encodings include:

Opcode extensions, including extensions for specifying conditionals (cnd and fcnd) and floating point rounding modes (rnd);

Register numbers (illustratively, for registers denominated Wn, Dn, Cn, In, An, Φn, Δn, and Fn);

Integer (imm, imr, ims5, imu6, imu8, and imu16) constant value encodings and floating point (imfs and imfd) constant value encodings;

Label numbers (lbl) and call signature numbers (sig); and
Dataflow annotations (dataflow).

Of the above operand encodings, the immediate, or literal, value encodings (i.e., imm, imr, ims5, imu6, imu8, imu16, imfs and imfd) are relevant to the Intercode endian-independent object code representation and to data translation and/or relocation by an Intercode translator.

For literal operands represented as immediate values in-line with Intercode opcodes, the storage size of a literal operand representation correlates with the associated Intercode instruction opcode and, for certain integer operands, with the particular operand encoding. Since literal operand values for Intercode instructions are encoded in a known endian format (namely, big-endian) and since the storage size of an individual immediate operand is encoded either by the associated Intercode instruction or by the operand encoding itself, an Intercode translator can perform the appropriate byte ordering transformation (if the target processor requires little endian format).

For pointer operands represented as immediate values in-line with Intercode instructions, individual pointer operands are represented as relocation (or rel) expressions. As before, relocation expressions compute a linear combination of relterms, where the translation time constants included therein evaluate to a first value if evaluated on a little-endian target processor and to a second value if evaluated on a big-endian target processor. In this way, pointer operand values can be specified independent of actual runtime location of the data to which the pointer operand refers and independent of endian format.

An imm or imr represents a variable length encoding of a signed constant value, as shown in FIG. 9B. In particular, the first three bits of encodings 921, 922, 923, 924, 925, 926 and 928 encode the length of the value. The value itself, if nonzero, is encoded in the 4, 8, 16, 32, or 64 bit portions of encodings 922, 923, 924, 925, and 926, respectively. A 32-bit signed word can also represent any unsigned 32-bit value when used in 32-bit operations. The 110 encoding is reserved for future expansion. In addition to these encodings a relocation encoding is also provided. As previously described, relocations are constants calculated at translation or run time. Relocations are specified by the 111 encoding followed by a rel expression, which has the same format as described above with reference to relocation of pointer data, i.e., each rel is made up of a series of relterms.

Individual opcode encodings determine the operands which follow. For example, the scalar movement instruction opcode defined in a presently preferred embodiment as:

| $07 | MOVE #imr,Wd | Wd←imr | has a first operand which is the imr source and a second which selects the register target (Wd). Other Intercode opcodes specify different operand encodings. An opcode specifying an imm must use one of the encodings %000 through %101, inclusive, while an imr can use those encodings or the relocation encoding %111.

An imm or imr represents a signed constant. As shown in FIG. 9B, the first three bits encode the length of the value. The value itself, if nonzero, is encoded in the following 4, 8, 16, 32, or 64 bits. A 32-bit signed word can also represent any unsigned 32-bit value when used in 32-bit operations. The 110 encoding is reserved for future expansion. Relocations, unlike the explicit values encoded in encodings 921, 922, 923, 924, 925, and 926, are constants calculated at translation or run time. Relocations are specified by the 111 encoding followed by a rel; w which has the same format as described above with reference to relocation of pointer data, i.e., each rel is made up of a series of relterms. An opcode which specifies an imm must use one of the encodings %000 through %101 (i.e., encoding 921, 922, 923, 924, 925, or 926), inclusive, while opcode which specifies an imr can use those encodings or the relocation encoding %111 (i.e., encoding 928).

The remaining immediate (i.e., literal) operand encodings, ims5, imu6, imu8, imu16, imfs, and imfd, are defined as follows. An ims5 represents a five-bit immediate value between −16 and 15, inclusive. An imu6 represents a five-bit immediate value between 0 and 63, inclusive. An imu8 represents an eight-bit immediate value between 0 and 255, inclusive. An imu16 represents a sixteen-bit immediate value between 0 and 65535, inclusive. An imfs is a 32-bit IEEE single-precision floating-point number. An imfd is a 64-bit IEEE double-precision floating-point number.

Intercode Translation Example

To illustrate the translation of Intercode object code and data, this section presents an example of C code and corresponding Intercode object code with reference to analogous portions of FIG. 2. The source program is the classic C program hello . c which contains the single function, main ():

```
#include <stdio.h>
int main()
{
printf("Hello, world!\n");
return 0;
}
``` which is analogous to function₁ 241 of application source code 240. The source program is compiled to produce a Multicode segment image file hello.o, which is analogous to Multicode segment image 210, but which includes a single object code function representation, illustratively Intercode function₁ 216, compiled by an Intercode compiler, illustratively Intercode compiler 205.

Intercode Source

Intercode compiler 205 is illustrative of a compiler/assembler which first compiles hello. c to an Intercode assembler source file hello. s:

```
        .SYSINCLUDE   "Intersd.h"
        .MAIN   main
;Compiled by GCC cygnus-2.6.0-940917.
        .RODATA
        .ALIGN        4
LC..0:
        .ASCII  "Hello, world!\n"
        .BYTE         0
        .CODE
        .GLOBL        main
        .FUNC         main
        .WREG         PW0~
        .WREG         UW0~
        .WREG         VW0~
        .WRES         VW0
        .SIG          sig1
        .AARG         PW0
        .VARARG
        .WRES         UW0
        .START
        MOVE          #LC..0,PW0
```

```
        CALLI      sig1,#-49
        MOVE       #0,VW0
        END
        .END
``` then compiles hello.s into a into a Multicode image file hello. o.

Multicode Segment Image

The assembler portion of Intercode compiler 205 compiles hello. s into Multicode image file hello .o, which is a binary file that can be executed with on a target processor using either a batch translator implementation (intertrans) or a caching translator implementation (intercache). Intercode translator 220c is illustrative of either the batch translator or aching translator implementation. Disassembling hello. o yields the following:

```
Disassembling "hello.x".
=========================================================
===
$00000020: Version attribute
    Required translator version $0174
    Segment version $0174
=========================================================
===
$00000024: FunctionList attribute
    1 functions
---------------------------------------------------------
---
    $0000002C: Function 1 'main'
        001 representations
        Representation 1:
            Code type $10 (Pure integer Intercode)
            Code variant flags $01 (standard)
            Code offset $04
            4 fields
            InstCount: $03 (3 instructions)
            RegInfo: $0A
                4-bit register numbers, 3 registers, 3 popular
                PW1 : Parameter Word, dead during fpop,
dead during double
                UW2 : Result Word, dead during fpop, dead
during double
                TW3 : Temporary Word, dead during fpop,
dead during double
            CallSigs: $12
            1-bit signatures, 1 signatures, 01 calls, 0 CALLIs
            Signature 1:
                01 arguments:
                    Address value in PW1
                01 return values:
                    Word value in UW2
                Last 01 arguments are varargs.
            ArgInfo: $0F
                0 arguments:
```

```
                01 return values:
                    Word value in TW3
            Code: $1A
                MOVE    #(sec4),PW1    ;$07 %0001
%111_0_000_0100
                CALLI   S1, #-049      ;$9C %010_$CF %1
                MOVE    #0,TW3         ;$04 %0011
                END                    ;$00
=========================================================
===
$00000052: FunctionNames attribute
    Starting number: 001, count: 001
        Function 1: $04 "main"
    Starting number: 000
=========================================================
===
$0000005C: MainFunction attribute
    Main function 1 'main'
=========================================================
===
$00000060: GlobalData attribute
    004 data sections
---------------------------------------------------------
---
    $00000061: Section 1
        000 data representations
---------------------------------------------------------
---
    $00000062: Section 2
        000 data representations
---------------------------------------------------------
---
    $00000063: Section 3
        000 data representations
---------------------------------------------------------
---
    $00000064: Section 4
        001 data representations
        $00000065: InitData representation, 025 bytes of
specification
            2^2-byte alignment
            015 bytes
            Flags: $15 (big-endian, endian translations, read-only)
            Data offset: 007
            Translation script offset: 022
            Data:
                $0:  $48 $65 $6C $6C $6F $2C $20 $77
                     $6F $72 $6C $64 $21 $0A $00   ;'Hello, world!..'
            Data translation script:
                $D2_0F     repeat 15 byte
                $00        end
End
```

The actual binary image of the Multicode segment image analogous to Multicode segment image 210, but which includes a single object code function representation of hello . c, is as follows:

| | | |
|---|---|---|
| 0000 | 0005 | Five segrnent attributes |
| 0002 | 0001 | Version attribute tag |
| 0004 | 0002 | FunctionList attribute tag |
| 0006 | 0003 | FunctionNames attribute tag (optional; for debugging) |
| 0008 | 0004 | MainFunction attribute tag |
| 000A | 0008 | GlobalData attribute tag |
| 000C | 00000020 | Version attribute offset |
| 0010 | 00000024 | FunctionList attribute offset |
| 0014 | 00000052 | FunctionNames attribute offset (optional; for debugging) |
| 0018 | 0000005C | MainFunction attribute offset |
| 001C | 00000060 | GlobalData attribute offset |

-continued

| | | |
|---|---|---|
| 0020 | 0174 | Version: Minimum version off translator required |
| 0022 | 0174 | Version of this segment |
| 0024 | 00000001 | FunctionList: One function descriptor |
| 0028 | 0000002C | Function 1 offset |
| 002C | 01 | Function 1: One function representation |
| 002D | 10 | Intercode code type |
| 002E | 01 | Flags |
| 002F | 04 | Offset from function descriptor to function header |
| 0030 | 04 | Function 1 header: Four header fields |
| 0031 | 1A | Offset to Intercode instructions |
| 0032 | 03 03 | InstCount: 3 Intercode instructions |
| 0034 | 08 0A | RegInfo: offset to register information field data |
| 0036 | 0A 12 | CallSigs: offset to call information field data |
| 0038 | 0B 0F | ArgInfo: offset to argument and return value field data |
| 003A | 219A31984C | Register information field data |
| 003F | 108930 | Argument and return value information field data |
| 0042 | 0D08850CD1249080 | Call information field data |
| 004A | 071E0938B3E08600 | Intercode instructions |
| 0052 | 01 | FunctionNames: Initial function number |
| 0053 | 01 | One function in range |
| 0054 | 04 | Length of function name |
| 0055 | 6D 61 69 6E | Function name |
| 0059 | 00 | End of list marker |
| 005A | 0000 | |
| 005C | 00000001 | MainFunction: Number of main function in segment |
| 0060 | 04 | GlobalData: Four data sections |
| 0061 | 00 | Section 1: None |
| 0062 | 00 | Section 2: None |
| 0063 | 00 | Section 3: None |
| 0064 | 01 | Section 4: One representation |
| 0065 | 04 | InitData representation kind |
| 0066 | 19 | Offset from representation kind byte to next representation |
| 0067 | 02 | Base-2 logarithm of required data alignment |
| 0068 | 0F | Data length |
| 0069 | 15 | Flags: big-endian, has translation script, read-only |
| 006A | 07 | Offset from representation kind byte to section data |
| 006B | 16 | Offset from representation kind byte to data translation script |
| 006C | 48 65 6C 6C | Data . . . |
| 0070 | 6F 2C 20 77 | . . . data . . . |
| 0074 | 6F 72 6C 64 | . . . data . . . |
| 0078 | 21 0A 00 | . . . data |
| 007B | D2 0F 00 | Data translation script |

The assembler traditionally uses fixed section numbers for various kinds of global data. For instance, section 4 is used for read-only data that could contain relocations. Intercode object code does not assign any special meanings to section numbers, and Intercode translator 220c does not care about which section is assigned to which number.

Translated Code

The hello . o Multicode segment image (illustratively, a Multicode segment image such as 210, including an Intercode object code representation such as 218) is the machine-independent object code format for distribution of the hello. c program on computer readable media, such as a disc, ROM, PCMCIA card, CD-ROM, etc. To illustrate how a Multicode segment image such as 210 can be converted at run time into native code for execution on a target processor such as target processor 223, this section lists the output of batch and caching implementations of an Intercode translator, illustratively Intercode translator 220c, for a MIPS target processor.

A batch translator implementation of Intercode translator 220c produces and executes the following code when passed hello .o. Note that on the MIPS architecture the instruction after a jump (jr) or subroutine call (jal) instruction is executed before the jump or call takes place.

| | | | | |
|---|---|---|---|---|
| 1000C5A4: | $27BDFFE8 | addiu | sp, sp, −24 | ;Allocate stack frame |
| 1000C5A8: | $AFBF0014 | sw | ra, 20(sp) | ;Save return address |
| 1000C5AC: | $3C041000 | lui | a0, 0x1000 | ;Get the address of "Hello, world!\n" |
| 1000C5B0: | $3484C48C | ori | a0, a0, 0xc48c | |
| 1000C5B4: | $0C003147 | jal | 0x1000c51c | ;CALLI(next instruction is in delay slot) |
| 1000C5B8: | $2401FFCF | li | at, −49 | ;Intrinsic number of printf |
| 1000C5BC: | $34080000 | li | t0, 0 | ;Set return value to zero |
| 1000C5C0: | $01001025 | move | v0, t0 | |
| 1000C5C4: | $8FBF0014 | lw | ra, 20(sp) | ;Restore return address |
| 1000C5C8: | $00000000 | nop | | ;(load delays lot) |

-continued

| | | | | |
|---|---|---|---|---|
| 1000C5CC: | $03E00008 | jr | ra | ;Return(next instruction is in delay slot) |
| 1000C5D0: | $27BD0018 | addiu | sp, sp, 24 | ;Deallocate stack frame |

A caching translator implementation produces and executes the code below when passed hello . o. Since the code is relocatable, a jal instruction cannot be used for the call to printf. Instead, the generated code puts the address of a return stub into the return address registers ra and stores a run-time function ID and offset within the function in registers s7 and s8. If the function is still in the cache when printf returns, the return stub jumps back to the proper place in the function; otherwise, the return stub re-translates the function and then jumps back to the proper place.

| | | | | |
|---|---|---|---|---|
| 1000C6AC: | $27BDFFE0 | addiu | sp, sp, −32 | ;Allocate stack frame |
| 1000C6B0: | $AFBF001C | sw | ra, 28(sp) | ;Save return address |
| 1000C6B4: | $AFBE0018 | sw | s8, 24(sp) | ;Save registers |
| 1000C6B8: | $AFB70014 | sw | s7, 20(sp) | |
| 1000C6BC: | $3C1F1000 | lui | ra, 0x1000 | ;Get address of return gate |
| 1000C6C0: | $37FFCA88 | ori | ra, ra, 0xcaB8 | |
| 1000C6C4: | $341E0002 | li | s8, 2 | ;Get run-time function unique ID |
| 1000C6C8: | $3C041000 | lui | a0, 0x1000 | ;Get the address of "Hello, world!\n" |
| 1000C6CC: | $3484C48C | ori | a0, a0, 0xc48c | |
| 1000C6D0: | $2401FFCF | li | at, −49 | ;Intrinsic number of printf |
| 1000C6D4: | $08003131 | j | 0x1000c4c4 | ;CALLI(next instruction is in delay slot) |
| 1000C6D8: | $3417005C | li | s7, 92 | ;Offset in function to which to return |
| 1000C6DC: | $34080000 | li | t0, 0 | ;Set return value to zero |
| 1000C6E0: | $01001025 | move | v0, t0 | |
| 1000C6E4: | $8FBF001C | lw | ra, 28 (sp) | ;Restore return address |
| 1000C6E8: | $8FBE0018 | lw | s8, 24 (sp) | ;Restore registers |
| 1000C6EC: | $8FB70014 | lw | s7, 20 (sp) | |
| 1000C6F0: | $03E00008 | jr | ra | ;Return (next instruction is in delay slot) |
| 1000C6F4: | $27BD0020 | addiu | sp, sp, 32 | ;Deallocate stack frame |

Other Embodiments

While the invention has been described with reference to various embodiments, it will be understood that these embodiments are illustrative and that the scope of the invention is not limited to them. Many variations, modifications, additions, and improvements of the embodiments described are possible.

For example, although much of this description is made in the context of the C and C++ programming languages, the selection C and C++ is for simplicity of description only and modifications for the support of additional programming languages such as Pascal, Ada, FORTRAN, PL/I, Lisp, etc., will be apparent to those skilled in the art. Alternative embodiments may encode transformations for additional target architecture dependent data format variations. Object code structures with larger or smaller numbers of component representations of data, including multiple representations of the same data, are envisioned. Furthermore, data translation scripts may include byte ordering transformations, relocation expressions, a byte ordering tranformation and a relocation expression, a byte ordering transformation but no relocation expressions, a relocation expression but no byte ordering transformations, etc. These and other variations, modifications, additions, and improvements may fall within the scope of the invention as defined in the claims which follow.

What is claimed is:

1. An object code structure for dynamic translation of an architecture-independent program implementation into native code for a target architecture, the object code structure encoded in computer readable media and comprising:

a code section;

a data section associated with the code section and including a first representation of data organized as units of storage;

a data translation script associated with the first representation, the data translation script including an instruction sequence for reversing byte ordering within the units of storage of the first representation when the first representation is not in accordance with byte ordering of the target architecture;

wherein the first representation includes first and second units of storage, the first unit of storage representing literal data and the second unit of storage representing pointer data;

wherein the data translation script includes a translation instruction corresponding to the first unit of storage and descriptive of an endian transformation of the literal data;

wherein the data translation script further includes a relocation expression corresponding to the second unit of storage and descriptive of a transformation of the pointer data to an effective memory address, the relocation expression encoding a linear combination of terms comprising one or more terms selected from a set comprising a constant term, a data section address term, a function gate address term, and a translation time constant term;

the object code structure further comprising first and second flags associated with the data section, the first flag indicating whether the first representation is in big-endian format and the second flag indicating whether the first representation is in little-endian format;

wherein the translation instruction transforms byte ordering of the first unit of storage,
when evaluated on a big-endian target architecture, if the first flag does not indicate that the first representation is in big-endian format, and
when evaluated on a little-endian target architecture, if the second flag does not indicate that the first representation is in little-endian format, wherein the translation time constant term, if any, evaluates to a first byte offset,
when evaluated on a big-endian target architecture, if the first representation flag does not indicate that the first representation is in big-endian format, and
when evaluated on a little-endian target architecture, if the first representation flag does not indicate that the first representation is in little-endian format; and wherein the translation time constant term, if any, evaluates to a second byte offset, otherwise.

2. An object code structure as recited in claim 1, wherein the first and second flags are encoded separately, and wherein first and second flag indications respectively indicating that the first representation is in big-endian and little-endian format signify that the first representation is endian neutral.

3. An object code structure as recited in claim 1, wherein the first and second flags are encoded as alternate states of a single storage location.

4. An object code structure as recited in claim 1, wherein the first byte offset is non-zero and the second byte offset is zero.

5. An object code structure as recited in claim 1:
wherein the translation time constant is for evaluation under control of a translation process running on the target architecture;
wherein, when the first representation is in big-endian format, evaluation of the translation time constant supplies a non-zero byte offset term in the relocation expression if the target architecture is little-endian and supplies a zero byte offset term in the relocation expression if the target architecture is big-endian; and
wherein, when the first representation is in little-endian format, evaluation of the translation time constant supplies a non-zero byte offset term in the relocation expression if the target architecture is big-endian and supplies a zero byte offset term in the relocation expression if the target architecture is little-endian.

6. An object code structure for dynamic translation of an architecture-independent program implementation into native code for a target architecture, the object code structure encoded in computer readable media and comprising:
a code section;
a data section associated with the code section and including first and second representations of data, each organized as units of storage, the first representation including first and second units of storage and the second representation including third and fourth units of storage, the first and third units of storage representing corresponding big-endian and little-endian representations of literal data, the second and fourth units of storage representing corresponding representations of pointer data;
a first data translation script associated with the first representation, the first data translation script including a first relocation expression corresponding to the second unit of storage and descriptive of a transformation of pointer data represented therein to an effective memory address; and
a second data translation script associated with the second representation, the second data translation script including a second relocation expression corresponding to the fourth unit of storage and descriptive of a transformation of pointer data represented therein to an effective memory address;

wherein the first and second relocation expressions encode linear combinations of terms, the linear combinations of terms comprising one or more terms selected from a set comprising a constant term, a data section address term, a function gate address term, and a translation time constant term.

7. An object code structure as recited in claim 6, wherein the translation time constant term, if any, evaluates to one of a first value and a second value depending on whether the corresponding relocation expression is evaluated on a big-endian or a little-endian target architecture.

8. An object code structure as recited in claim 7, wherein the first value is a non-zero byte offset and the second value is a zero byte offset.

9. An object code structure for dynamic translation of an architecture-independent program implementation into native code for a target architecture, the object code structure encoded in computer readable media and comprising:
a code section;
a data section associated with the code section and including a first representation of data organized as units of storage; and
a data translation script associated with the first representation, the data translation script including an instruction sequence for reversing byte ordering within the units of storage of the first representation when the first representation is not in accordance with byte ordering of the target architecture;

wherein the first representation includes first and second units of storage, the first unit of storage representing literal data and the second unit of storage representing pointer data;

wherein the data translation script includes a translation instruction corresponding to the first unit of storage and descriptive of an endian transformation of the literal data;

wherein the data translation script further includes a relocation expression corresponding to the second unit of storage and descriptive of a transformation of the pointer data to an effective memory address, the relocation expression encoding a linear combination of terms comprising one or more terms selected from a set comprising a constant term, a data section address term, a function gate address term, and a translation time constant term; and wherein the translation time constant term, if any, evaluates to a first byte offset,
when evaluated on a big-endian target architecture, if the first representation flag does not indicate that the first representation is in big-endian format, and
when evaluated on a little-endian target architecture, if the first representation flag does not indicate that the first representation is in little-endian format; and wherein the translation time constant term, if any, evaluates to a second byte offset, otherwise.

10. An object code structure as recited in claim 9, wherein the first and second flags are encoded separately, and wherein first and second flag indications respectively indicating that the first representation is in big-endian and little-endian format signify that the first representation is endian neutral.

11. An object code structure as recited in claim 9, wherein the first and second flags are encoded as alternate states of a single storage location.

12. An object code structure as recited in claim 9:
   wherein the translation time constant is for evaluation under control of a translation process running on the target architecture;
   wherein, when the first representation is in big-endian format, evaluation of the translation time constant supplies a non-zero byte offset term in the relocation expression if the target architecture is little-endian and supplies a zero byte offset term in the relocation expression if the target architecture is big-endian; and
   wherein, when the first representation is in little-endian format, evaluation of the translation time constant supplies a non-zero byte offset term in the relocation expression if the target architecture is big-endian and supplies a zero byte offset term in the relocation expression if the target architecture is little-endian.

13. An object code structure as recited in claim 9, further comprising:
   first and second flags associated with the data section, the first flag indicating whether the first representation is in big-endian format and the second flag indicating whether the first representation is in little-endian format,
   wherein the translation instruction transforms byte ordering of the first unit of storage,
      when evaluated on a big-endian target architecture, if the first flag does not indicate that the first representation is in big-endian format, and
      when evaluated on a little-endian target architecture, if the second flag does not indicate that the first representation is in little-endian format.

* * * * *